(12) United States Patent
Otsubo et al.

(10) Patent No.: US 9,840,048 B2
(45) Date of Patent: Dec. 12, 2017

(54) MANUFACTURING METHOD FOR HIGH-PRESSURE TANK, AND HIGH-PRESSURE TANK

(75) Inventors: Hirokazu Otsubo, Nagoya (JP); Shiro Nishibu, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 106 days.

(21) Appl. No.: 13/980,718

(22) PCT Filed: Jan. 19, 2012

(86) PCT No.: PCT/IB2012/000069
§ 371 (c)(1),
(2), (4) Date: Jul. 19, 2013

(87) PCT Pub. No.: WO2012/104690
PCT Pub. Date: Aug. 9, 2012

(65) Prior Publication Data
US 2013/0299505 A1 Nov. 14, 2013

(30) Foreign Application Priority Data
Feb. 2, 2011 (JP) .................................. 2011-020326

(51) Int. Cl.
*F17C 1/06* (2006.01)
*B29D 22/00* (2006.01)
(Continued)

(52) U.S. Cl.
CPC .......... *B29D 22/003* (2013.01); *B29C 53/602* (2013.01); *B29C 70/222* (2013.01);
(Continued)

(58) Field of Classification Search
CPC ...... F17C 1/16; F17C 1/00; F17C 1/04; F17C 1/05; F17C 2201/0109; F17C 2201/056;
(Continued)

(56) References Cited

U.S. PATENT DOCUMENTS 6,361,635 B1 * 3/2002 Ayorinde ............. B29C 53/602
156/169
2010/0276434 A1 11/2010 Berger et al.
(Continued)

FOREIGN PATENT DOCUMENTS

JP A-8-216277 8/1996
JP A-2004-293571 10/2004
(Continued)

*Primary Examiner* — Fenn C Mathew
*Assistant Examiner* — Elizabeth Volz
(74) *Attorney, Agent, or Firm* — Oliff PLC

(57) ABSTRACT

A step of forming a low-angle helical layer on an outer surface of at least part of each liner dome portion and an outer surface of a liner cylindrical portion, a step of forming an inner hoop layer on an outer surface of the low-angle helical layer on the liner cylindrical portion, and a step of forming a mixed layer by alternately laminating a low-angle helical layer and an outer hoop layer on an outer surface of the inner hoop layer and low-angle helical layer on each liner dome portion. Then, on the liner cylindrical portion, 90% or more of the sum of the thickness of the inner hoop layer and the thickness of the outer hoop layer in the mixed layer is arranged within the range of 75% of the fiber reinforced plastics layer adjacent to the liner in a thickness direction of the fiber reinforced plastics layer.

9 Claims, 4 Drawing Sheets

(51) Int. Cl.

| | |
|---|---|
| *B29C 53/60* | (2006.01) |
| *B29C 70/22* | (2006.01) |
| *B29C 70/32* | (2006.01) |
| *F17C 1/16* | (2006.01) |
| *F17C 1/00* | (2006.01) |
| *F17C 1/04* | (2006.01) |
| *B32B 1/02* | (2006.01) |
| *B32B 1/00* | (2006.01) |
| *B29C 63/24* | (2006.01) |
| *B29L 31/00* | (2006.01) |

(52) U.S. Cl.
CPC ............... *B29C 70/32* (2013.01); *F17C 1/00* (2013.01); *F17C 1/16* (2013.01); *B29C 63/24* (2013.01); *B29L 2031/7156* (2013.01); *B32B 1/00* (2013.01); *B32B 1/02* (2013.01); *F17C 1/04* (2013.01); *F17C 1/06* (2013.01); *F17C 2201/0109* (2013.01); *F17C 2201/056* (2013.01); *F17C 2201/058* (2013.01); *F17C 2203/066* (2013.01); *F17C 2203/067* (2013.01); *F17C 2203/0619* (2013.01); *F17C 2203/0643* (2013.01); *F17C 2203/0646* (2013.01); *F17C 2203/0665* (2013.01); *F17C 2205/0397* (2013.01); *F17C 2209/2154* (2013.01); *F17C 2209/232* (2013.01); *F17C 2221/012* (2013.01); *F17C 2221/033* (2013.01); *F17C 2223/0123* (2013.01); *F17C 2223/036* (2013.01); *F17C 2260/011* (2013.01); *F17C 2270/0168* (2013.01); *Y02E 60/321* (2013.01)

(58) Field of Classification Search
CPC ........ F17C 2201/058; F17C 2203/0619; F17C 2203/0643; F17C 2203/0646; F17C 2203/066; F17C 2203/0665; F17C 2203/067; F17C 1/06; F17C 2205/0397; F17C 2209/2154; F17C 2209/232; F17C 2221/013; F17C 2221/033; F17C 2223/0123; F17C 2223/036; F17C 2260/011; F17C 2270/0168; B32B 1/00; B32B 1/02; B29D 22/003; B29C 53/602; B29C 70/222; B29C 70/32; B29C 63/24; Y02E 60/321
USPC ........... 220/586, 590; 242/430; 156/64, 172, 156/425
See application file for complete search history.

(56) References Cited

U.S. PATENT DOCUMENTS

2011/0015905 A1* 1/2011 Gull .................... G06F 17/5018
                                                              703/2
2013/0087567 A1   4/2013 Kaneko et al.

FOREIGN PATENT DOCUMENTS

| JP | 200832088 | * | 2/2008 | ................ F17C 1/06 |
|---|---|---|---|---|
| JP | 2008032088 | * | 2/2008 | ................ F17C 1/06 |
| JP | 2008045066 | * | 2/2008 | ................ F17C 1/00 |
| JP | 2008045660 | * | 2/2008 | ................ F17C 1/00 |
| JP | A-2008-45660 | | 2/2008 | |
| WO | WO 2011/154994 A1 | | 12/2011 | |

* cited by examiner

HOOP LAYER

LOW-ANGLE HELICAL LAYER

HIGH-ANGLE HELICAL LAYER

INNER HELICAL LAYER FORMING STEP

INNER HOOP LAYER FORMING STEP

MIXED LAYER FORMING STEP

MANUFACTURING METHOD FOR HIGH-PRESSURE TANK, AND HIGH-PRESSURE TANK

BACKGROUND OF THE INVENTION

1. Field of the Invention

The invention relates to a manufacturing method for a high-pressure tank, and a high-pressure tank.

2. Description of Related Art

In recent years, there has been developed a vehicle that is driven by energy on combustion of fuel gas or electrical energy generated by electrochemical reaction of fuel gas. Such a vehicle may be equipped with a high-pressure tank that stores fuel gas, such as natural gas and hydrogen. In this case, in order to reduce the size of the high-pressure tank in consideration of mountability of the high-pressure tank on a vehicle while extending the cruising range of the vehicle, it is required to fill the high-pressure tank with fuel gas at a higher fill pressure.

In order to fill the high-pressure tank with fuel gas at a higher fill pressure, it is necessary to improve the strength of the high-pressure tank. Then, there is known a technique for forming a fiber reinforced plastics (FRP) layer on the outer surface of a metal or resin liner (inner casing) using filament winding as a technique for improving the strength of the high-pressure tank. Then, when the liner has a cylindrical portion that has a cylindrical shape and dome portions that have a domical shape and that are provided on both ends of the cylindrical portion, a fiber reinforced plastics layer formed by the filament winding generally mostly includes a hoop layer that is formed by hoop winding and a helical layer that is formed by helical winding. The hoop layer is mainly used to improve the strength against internal pressure applied in the circumferential direction of the liner (hereinafter, also referred to as "the circumferential strength of the liner"). On the other hand, the helical layer is mainly used to improve the strength against internal pressure applied in the axial direction of the liner (hereinafter, also referred to as "the axial strength of the liner").

Incidentally, in an existing art, various techniques for improving the strength of a high-pressure tank that includes a fiber reinforced plastics layer on the outer surface of the liner have been suggested. For example, the strength of the high-pressure tank may be improved in such a manner that the fiber reinforced plastics layer is formed of alternately laminated hoop layers and helical layers (for example, see Japanese Patent Application Publication No. 2008-45660 (JP-A-2008-45660), Japanese Patent Application Publication No. 2004-293571 (JP-A-2004-293571) and Japanese Patent Application Publication No. 8-216277 (JP-A-8-216277).

However, there is room for improvement in the techniques described in JP-A-2008-45660, JP-A-2004-293571 and JP-A-8-216277 in terms of the reliability, that is, the pressure resistance and durability, of a high-pressure tank.

SUMMARY OF THE INVENTION

The invention improves the reliability of a high-pressure tank that includes a fiber reinforced plastics layer formed on the outer surface of a liner by filament winding.

An aspect of the invention relates to a manufacturing method for a high-pressure tank that is used to store fluid. The manufacturing method include: a step of preparing a liner that has a cylindrical portion having a cylindrical shape and dome portions having a domical shape and provided on both ends of the cylindrical portion; and a fiber reinforced plastics layer forming step of forming a fiber reinforced plastics layer on an outer surface of the liner by filament winding, wherein the fiber reinforced plastics layer forming step includes: an inner helical layer forming step of forming an inner helical layer by winding a fiber impregnated with thermosetting resin on an outer surface of at least part of each dome portion and an outer surface of the cylindrical portion by helical winding; an inner hoop layer forming step of forming an inner hoop layer by winding a fiber impregnated with thermosetting resin on an outer surface of the inner helical layer on the cylindrical portion by hoop winding in multiple layers; and a mixed layer forming step of forming a mixed layer by laminating an outer helical layer, which is formed by winding a fiber impregnated with thermosetting resin by helical winding, and an outer hoop layer, which is formed by winding a fiber impregnated with thermosetting resin by hoop winding, on an outer surface of the inner hoop layer and an outer surface of the inner helical layer on each dome portion, and the inner helical layer forming step, the inner hoop layer forming step and the mixed layer forming step include a step of forming the inner helical layer, the inner hoop layer and the mixed layer such that, on the cylindrical portion, 90% or more of the sum of a thickness of the inner hoop layer and a thickness of the outer hoop layer is arranged within a range of 75% of the fiber reinforced plastics layer adjacent to the liner in a thickness direction of the fiber reinforced plastics layer.

Hoop winding more significantly exhibits the effect of improving the circumferential strength of the liner than helical winding. In addition, when the high-pressure tank is filled with high-pressure gas, stress applied in the circumferential direction of the liner in the fiber reinforced plastics layer formed on the outer surface of the cylindrical portion of the liner increases toward an inner layer side (inner side) (thick cylinder theory).

With the manufacturing method for a high-pressure tank according to the above aspect, after the strength of the liner (particularly, the dome portions) is enhanced through the inner helical layer forming step, the inner hoop layer forming step is carried out, so it is possible to suppress deformation of the liner at the time when the inner hoop layer forming step is carried out. This is particularly effective when the inner hoop layer forming step is carried out while applying a relatively high tension to a fiber in a state where internal pressure is applied to the liner. Furthermore, with the manufacturing method for a high-pressure tank according to the above aspect, hoop winding that significantly exhibits the effect of improving the circumferential strength of the liner is concentratively laminated at the inner layer side at which stress applied in the circumferential direction of the liner is relatively large, so it is possible to effectively improve the circumferential strength of the liner. Note that the thickness of the fiber reinforced plastics layer on the cylindrical portion of the liner is a thickness in a region in which the thickness of the fiber reinforced plastics layer is substantially constant on the cylindrical portion of the liner. This also applies to the thickness of the inner hoop layer on the cylindrical portion of the liner and the thickness of the outer hoop layer. Then, it was empirically confirmed that the reliability of the high-pressure tank may be improved by the manufacturing method for a high-pressure tank according to the above aspect.

In addition, the effect of improving the strength of the high-pressure tank, exhibited by each layer in the fiber reinforced plastics layer, may be effectively utilized as compared with the existing art, so, in order to obtain the performance (the pressure resistance and durability) of the high-pressure tank equivalent to the existing art, the total number of layers that constitute the fiber reinforced plastics layer may be reduced. Thus, it is possible to reduce the size, weight and cost of the high-pressure tank. In addition, in order to obtain the performance of the high-pressure tank equivalent to the existing art, when a fiber with a lower grade in terms of strength or stiffness is used, it is possible to reduce the cost of the high-pressure tank. In addition, when the number of the layers that constitute the fiber reinforced plastics layers is equal to that of the existing art, it is possible to improve the strength of the high-pressure tank. In addition, when the outer shape of the high-pressure tank is the same as that of the existing art, it is possible to increase the capacity of the liner. Thus, when the high-pressure tank is filled with fuel gas and is then mounted on, for example, a vehicle, it is possible to extend the cruising range of the vehicle.

Note that, in the manufacturing method for a high-pressure tank according to the above aspect, the thermosetting resin included in the inner helical layer, the thermosetting resin included in the inner hoop layer, and the thermosetting resin included in the mixed layer (the outer helical layer and the outer hoop layer) may be of the same type or at least one of them may be of a different type. In addition, the fiber included in the inner helical layer, the fiber included in the inner hoop layer and the fiber included in the mixed layer may be of the same type or at least one of them may be of a different type.

In the manufacturing method for a high-pressure tank according to the above aspect, the helical winding in the inner helical layer forming step may be such that, before the fiber that constitutes the inner helical layer goes around a central axis of the liner on the outer surface of the cylindrical portion, a winding direction of the fiber is turned on any one of the dome portions.

The helical winding is roughly classified into helical winding (hereinafter, also referred to as "high-angle helical winding") having a relatively large winding angle such that, after the fiber at least goes around a central axis of the liner on the cylindrical portion of the liner, a winding direction of the fiber is turned on any one of the dome portions of the liner and helical winding (hereinafter, also referred to as "low-angle helical winding") having a relatively small winding angle such that, before the fiber goes around the central axis of the liner on the cylindrical portion of the liner, a winding direction of the fiber is turned on any one of the dome portions of the liner. Then, the low-angle helical winding more significantly exhibits the effect of improving the axial strength of the liner than the high-angle helical winding.

With the manufacturing method for a high-pressure tank according to the above aspect, the low-angle helical winding is used in the inner helical layer forming step, so it is possible to effectively improve the axial strength of the liner. In addition, the low-angle helical winding is able to reduce the number of windings, that is, the usage of the fiber, as compared with the high-angle helical winding in order to obtain the same strength in terms of the axial strength of the liner, so it is possible to reduce the size, weight and cost of the high-pressure tank.

In the manufacturing method for a high-pressure tank according to the above aspect, the inner hoop layer forming step may include a step of forming the inner hoop layer such that, on the cylindrical portion, a thickness of the inner hoop layer is reduced as a portion of the inner hoop layer approaches a boundary portion between the cylindrical portion and each dome portion.

With the manufacturing method for a high-pressure tank according to the above aspect, each edge of the inner hoop layer is formed in a slant shape to thereby make it possible to suppress a loss of winding shape of the fiber at each edge of the inner hoop layer. In addition, each edge of the inner hoop layer is formed in a slant shape to suppress meandering of the fiber, that is, deviation of the winding position of the fiber, at the time of winding the fiber when the low-angle helical winding is used to form the outer helical layer in the mixed layer, so it is possible to effectively utilize the effect of improving the axial strength of the liner, exhibited by the low-angle helical winding.

Note that a mode in which each edge of the inner hoop layer is formed in a slant shape may be a mode in which the number of fibers wound is partially changed at the boundary portion of the cylindrical portion of the liner with each dome portion or a mode in which the thickness of the fiber is partially changed at the boundary portion. The thickness of a portion other than each edge of the inner hoop layer is substantially constant.

In the manufacturing method for a high-pressure tank according to the above aspect, the liner may have a discontinuous shape at the boundary portion between the cylindrical portion and each dome portion, and the inner helical layer forming step and the inner hoop layer forming step may include a step of forming the inner helical layer and the inner hoop layer such that an outer surface of the inner hoop layer and inner helical layer on each dome portion forms a uniform stress surface.

With the manufacturing method for a high-pressure tank according to the above aspect, the outer surface of the inner hoop layer and inner helical layer on each dome portion of the liner forms a uniform stress surface, so the outer helical layer in the mixed layer formed on the above outer surface of these layers is formed at uniform stress and may be effectively utilized to improve the strength of the high-pressure tank.

In the manufacturing method for a high-pressure tank according to the above aspect, the helical winding in the mixed layer forming step may be such that, before the fiber that constitutes the outer helical layer goes around a central axis of the liner, a winding direction of the fiber is turned on any one of the dome portions.

With the manufacturing method for a high-pressure tank according to the above aspect, the axial strength of the liner is effectively improved, and it is possible to reduce the size, weight and cost of the high-pressure tank.

Note that the aspect of the invention may be not only implemented as the above described manufacturing method for a high-pressure tank but also implemented as a high-pressure tank manufactured by the above described manufacturing method.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

A. Configuration of High-Pressure Tank

Figure 1A:
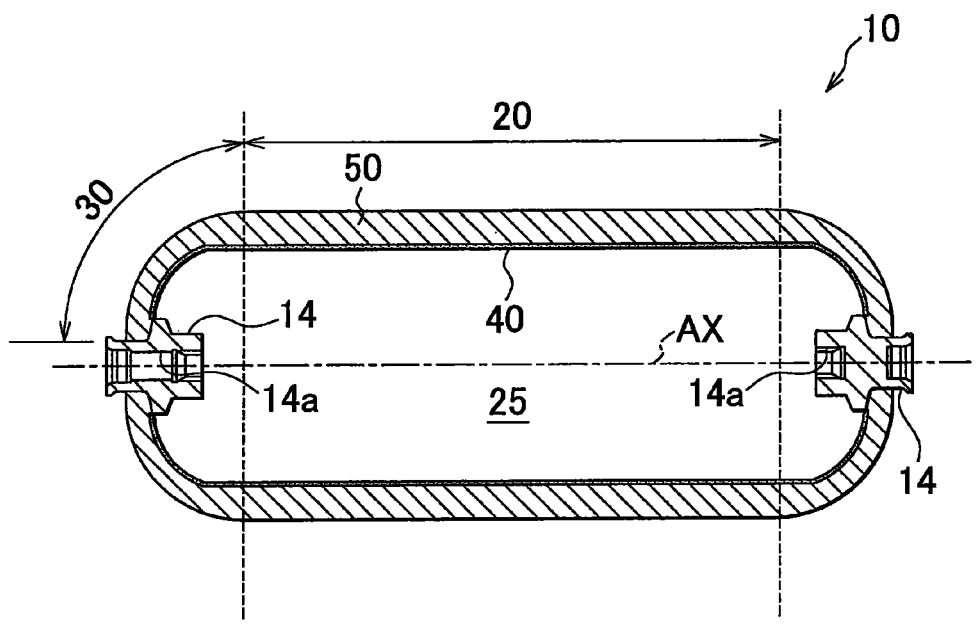
FIG. 1A and FIG. 1B are views that illustrate the schematic configuration of a high-pressure tank according to an embodiment of the invention.
Figure 1B:
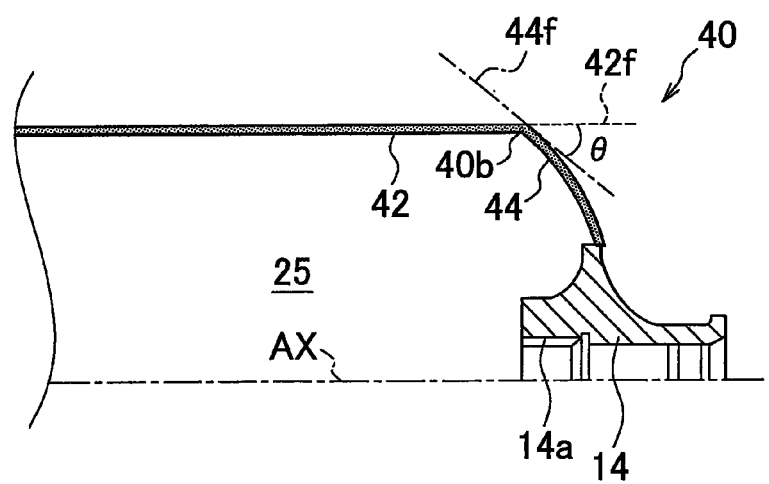

FIG. 1A and FIG. 1B are views that illustrate the schematic configuration of a high-pressure tank 10 according to the embodiment of the invention. FIG. 1A shows the cross-sectional view of the high-pressure tank 10. In addition, FIG. 1B shows a partially enlarged view of FIG. 1A. Note that, in FIG. 1B, illustration of a fiber reinforced plastics layer 50 (described later) is omitted.

As shown in FIG. 1A, the high-pressure tank 10 includes a liner 40, the fiber reinforced plastics layer 50 and two end fittings 14. The fiber reinforced plastics layer 50 covers the surface of the liner 40. Each of the end fittings 14 has an opening 14a. Note that, in the present embodiment, the high-pressure tank 10 includes the two end fittings 14; instead, the high-pressure tank 10 may include a single end fitting 14.

The liner 40 forms the inner shell of the high-pressure tank 10. The liner 40 is a hollow member and is also called inner casing. The liner 40 has a space 25 inside. The space 25 stores fluid. The liner 40 has a gas barrier property and suppresses permeation of gas, such as hydrogen gas, to the outside. The liner 40 is manufactured using a synthetic resin, such as a nylon-based resin and a polyethylene-based resin, or a metal, such as aluminum and stainless steel. In the present embodiment, the liner 40 is integrally molded using a nylon-based resin. The liner 40 may be formed by connecting a plurality of members.

The fiber reinforced plastics layer 50 is formed on the outer surface of the liner 40, and is a layer in which thermosetting resin is reinforced by fibers. In the present embodiment, the fiber reinforced plastics layer 50 is formed by filament winding. The filament winding is a method in which a fiber impregnated with thermosetting resin is wound around a mandrel (in the present embodiment, the liner 40) and then the thermosetting resin is thermally cured. Note that a method of winding a fiber will be described later. The thermosetting resin may be epoxy resin, polyester resin, polyamide resin, or the like. In the present embodiment, epoxy resin is used. In addition, the fiber may be various fibers, that is, an inorganic fiber, such as a metal fiber, a glass fiber, a carbon fiber and an alumina fiber, a synthetic organic fiber, such as an aramid fiber, or a natural organic fiber, such as cotton. These fibers may be used solely or two or more types of fibers may be mixed and used. In the present embodiment, a carbon fiber is used as the fiber.

The high-pressure tank 10 has a cylindrical portion 20 and dome portions 30. The cylindrical portion 20 has a substantially cylindrical shape. The dome portions 30 each have a domical shape, and are located on both sides of the cylindrical portion 20. Each dome portion 30 is formed such that the diameter reduces as a portion leaves from the cylindrical portion 20 in the direction along the central axis Ax of a liner cylindrical portion 42. The portion having the smallest diameter is open, and the end fitting 14 is inserted in the opening.

As shown in FIG. 1B, the liner 40 has the liner cylindrical portion 42 and liner dome portions 44. The liner cylindrical portion 42 has a cylindrical shape. The liner dome portions 44 each have a domical shape, and are provided on both ends of the liner cylindrical portion 42. Each liner dome portion 44 is formed such that the diameter reduces as a portion leaves from the liner cylindrical portion 42 in the direction along the central axis Ax of the liner cylindrical portion 42. In addition, the outer surface of each liner dome portion 44 is a uniform stress surface. Note that the liner 40 is molded such that, at a boundary portion 40b between the liner cylindrical portion 42 and each liner dome portion 44, the tangent 42f of the outer surface of the liner cylindrical portion 42 is discontinuous with the tangent 44f of the outer surface of each liner dome portion 44. In other words, the liner 40 is molded such that, at the boundary portion 40b between the liner cylindrical portion 42 and each liner dome portion 44, the tangent 42f of the outer surface of the liner cylindrical portion 42 does not coincide with the tangent 44f of the outer surface of each liner dome portion 44. Furthermore, in other words, the liner 40 is molded such that, at the boundary portion 40b between the liner cylindrical portion 42 and each liner dome portion 44, the tangent 44f of the outer surface of each liner dome portion 44 is inclined at an angle θ with respect to the tangent 42f of the outer surface of the liner cylindrical portion 42.

In addition, as is apparent from FIG. 1A, the boundary portion in the high-pressure tank 10 between the cylindrical portion 20 and each dome portion 30 is different in position in the direction along the central axis AX from the boundary portion 40b in the liner 40 between the liner cylindrical portion 42 and a corresponding one of the liner dome portions 44.

B. Manufacturing Method for High-Pressure Tank

Before a manufacturing method for the high-pressure tank 10 is described, a general method of winding a fiber, which is used to form a fiber reinforced plastics layer, will be described.

Figure 2A:
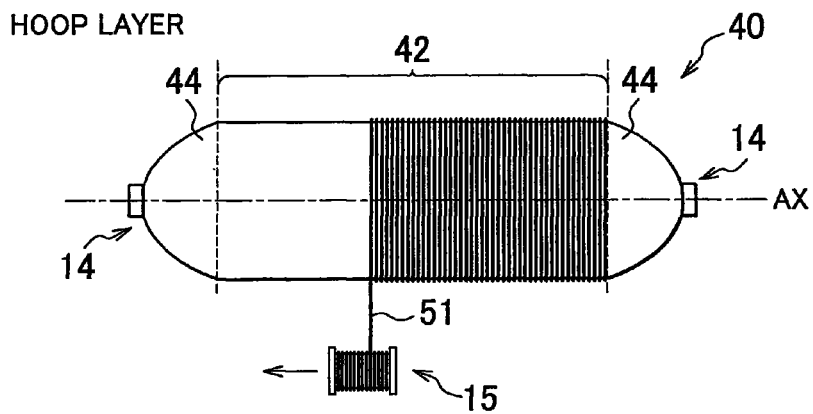
FIG. 2A to FIG. 2C are views that illustrate various winding methods for fibers, used to form a fiber reinforced plastics layer.
Figure 2B:
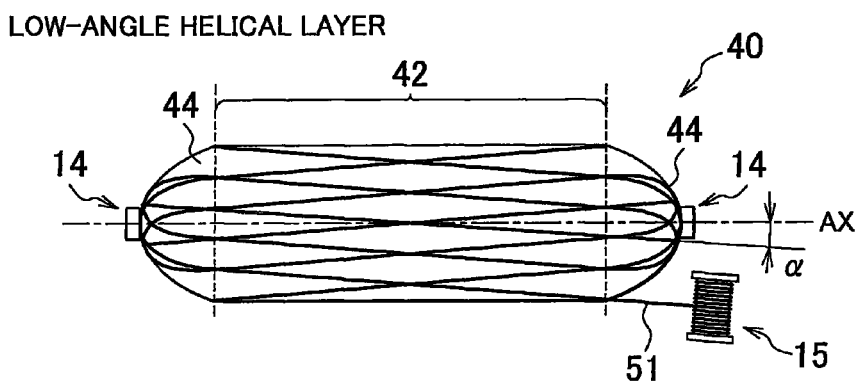
Figure 2C:
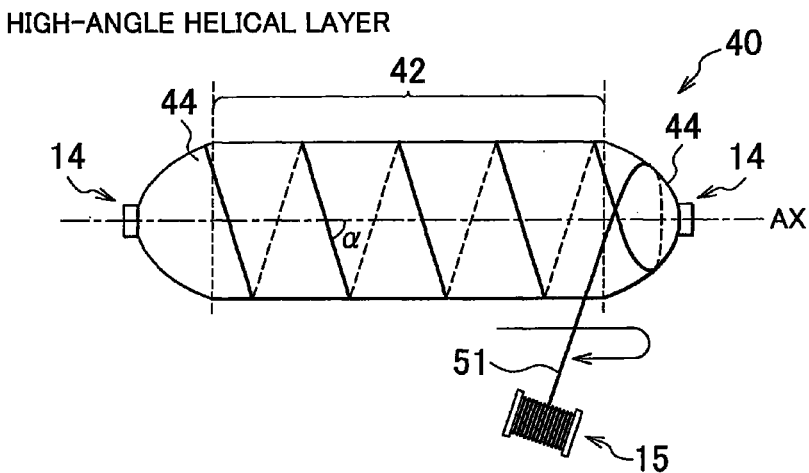

FIG. 2A to FIG. 2C are views that illustrate various methods of winding a fiber, used to form a fiber reinforced plastics layer. In this specification, hoop winding and helical winding will be described. Note that, for the helical winding, low-angle helical winding and high-angle helical winding (described later) will be described.

FIG. 2A is a view that illustrates hoop winding. FIG. 2A shows a state where a fiber 51 is wound around the liner 40 by hoop winding. The "hoop winding" is a method in which the fiber 51 is wound such that the winding direction of the fiber 51 is substantially vertical to the central axis AX of the liner cylindrical portion 42, and the winding position (the position of a reel 15) is moved in the direction along the central axis AX. That is, the "hoop winding" is a method in which the fiber 51 is wound such that an angle α formed by the central axis AX and the winding direction of the fiber 51 ("winding angle α") is substantially vertical. Note that the condition "winding angle of the fiber 51 by hoop winding is substantially vertical" includes 90 degrees and an angle around 90 degrees, which may occur when the winding position of the fiber is deviated such that the fibers do not overlap each other. A layer formed by the hoop winding is called "hoop layer".

FIG. 2B is a view that illustrates low-angle helical winding. FIG. 2B shows a state where the fiber 51 is wound around the liner 40 by low-angle helical winding. The "low-angle helical winding" is a winding method having a relatively small winding angle α in which, before the fiber 51 goes around the central axis AX in the liner cylindrical portion 42, the winding direction of the fiber 51 is turned on any one of the liner dome portions 44. A layer formed by the low-angle helical winding is called "low-angle helical layer".

FIG. 2C is a view that illustrates high-angle helical winding. FIG. 2C shows a state where the fiber 51 is wound around the liner 40 by high-angle helical winding. The "high-angle helical winding" is a winding method having a relatively large winding angle α in which, after the fiber 51 at least goes around the central axis AX on the liner cylindrical portion 42, the winding direction of the fiber 51 is turned on any one of the liner dome portions 44. A layer formed by the high-angle helical winding is called "high-angle helical layer".

Figure 3A:
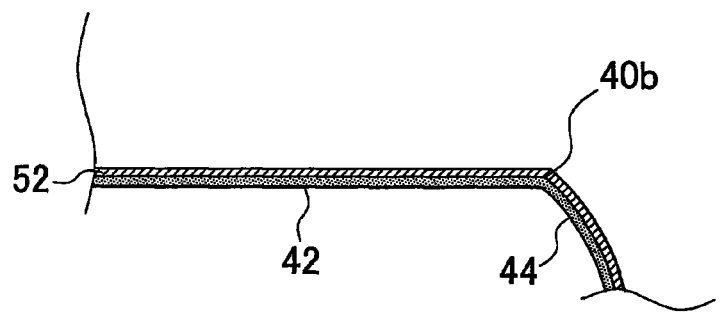
FIG. 3A to FIG. 3C are views that illustrate part of a manufacturing method for a high-pressure tank.
Figure 3B:
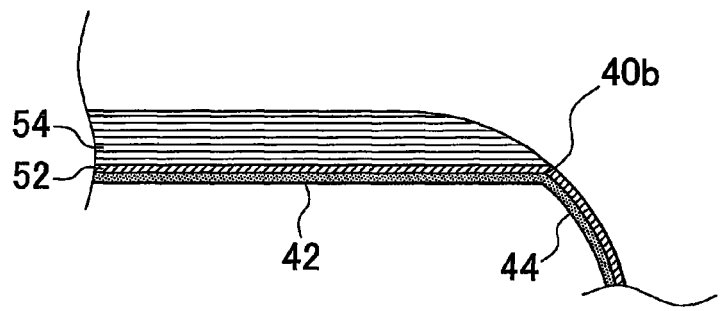
Figure 3C:
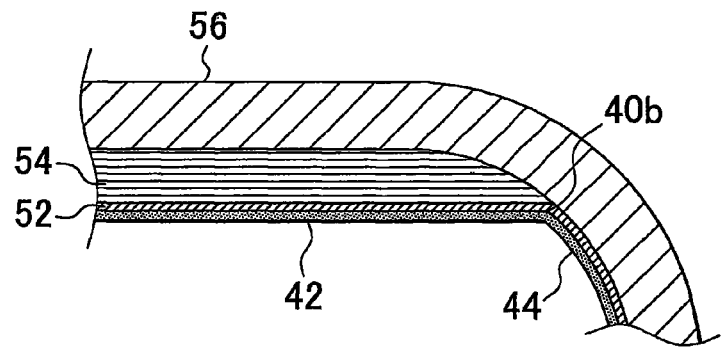

FIG. 3A to FIG. 3C are views that illustrate part of a manufacturing method for the high-pressure tank 10. FIG. 3A to FIG. 3C show partially cross-sectional views of the high-pressure tank 10. Note that illustration of the central axis AX of the liner cylindrical portion 42 is omitted; however, the horizontal direction of the drawing is the direction along the central axis AX of the liner cylindrical portion 42.

First, the liner 40 (see FIG. 1) having the above described shape is prepared, internal pressure is applied to the liner 40, and then, as shown in FIG. 3A, a fiber impregnated with thermosetting resin is wound around the outer surfaces of the liner dome portions 44 and the outer surface of the liner cylindrical portion 42 by low-angle helical winding to form a low-angle helical layer 52 (inner helical layer forming step). Note that, in the present embodiment, the number of the low-angle helical layers 52 is one.

Subsequently, as shown in FIG. 3B, a fiber impregnated with thermosetting resin is wound around the outer surface of the low-angle helical layer 52 on the liner cylindrical portion 42 in multiple layers by hoop winding to thereby form an inner hoop layer 54 (inner hoop layer forming step). At this time, the inner hoop layer 54 is formed such that, on the liner cylindrical portion 42, the thickness of the inner hoop layer 54 is reduced as a portion of the inner hoop layer 54 approaches the boundary portion 40b between the liner cylindrical portion 42 and each liner dome portion 44. In the present embodiment, each time the single inner hoop layer 54 is formed, the turning position of hoop winding, that is, an end of each layer in the inner hoop layer 54 is deviated from the boundary portion 40b in the direction along the central axis AX (toward the center of the liner cylindrical portion 42). Note that, in the present embodiment, in order to effectively improve the circumferential strength of the liner 40, the inner hoop layer 54 is formed while a relatively high tension is applied to the fiber in a state where internal pressure is applied to the liner 40.

Next, as shown in FIG. 3C, a low-angle helical layer (outer helical layer), which is formed by winding a fiber impregnated with thermosetting resin by low-angle helical winding, and a hoop layer (outer hoop layer), which is formed by winding a fiber impregnated with thermosetting resin by hoop winding, are alternately laminated on the outer surface of the inner hoop layer 54 and low-angle helical layer 52 on each liner dome portion 44 to form a mixed layer 56 (mixed layer forming step). Note that, in the present embodiment, the inner helical layer forming step, the inner hoop layer forming step and the mixed layer forming step include the step of forming the low-angle helical layer 52, the single inner hoop layer 54 and the mixed layer 56 such that, on the liner cylindrical portion 42, 90% or more of the sum of the thickness of the inner hoop layer 54 and the thickness of the outer hoop layer in the mixed layer 56 are arranged within the range of 60% of the fiber reinforced plastics layer 50 adjacent to the liner 40 in the thickness direction of the fiber reinforced plastics layer 50. In addition, alternately laminating the low-angle helical layer (outer helical layer) and the hoop layer (outer hoop layer) at the time of forming the mixed layer 56 includes not only a mode in which the low-angle helical layer and the hoop layer are alternately laminated by a single layer but also a mode in which the low-angle helical layer and the hoop layer are alternately laminated by multiple layers. When the low-angle helical layer and the hoop layer are alternately laminated by multiple layers, the numbers of the alternately laminated low-angle helical layers and hoop layers may be the same or may be different.

Then, after forming the mixed layer 56, thermosetting resin included in the low-angle helical layer 52, the inner hoop layer 54 and the mixed layer 56 is thermally cured. Through the above manufacturing steps, the high-pressure tank 10 is completed.

C. Advantageous Effects of Embodiment

The advantageous effects of the high-pressure tank 10 according to the present embodiment will be described. Here, the advantageous effects on the burst pressure of the high-pressure tank 10, the number of endurance cycles in the accelerated cycle test and the thickness of the fiber reinforced plastics layer 50 will be described.

C1. Burst Pressure

Figure 4:
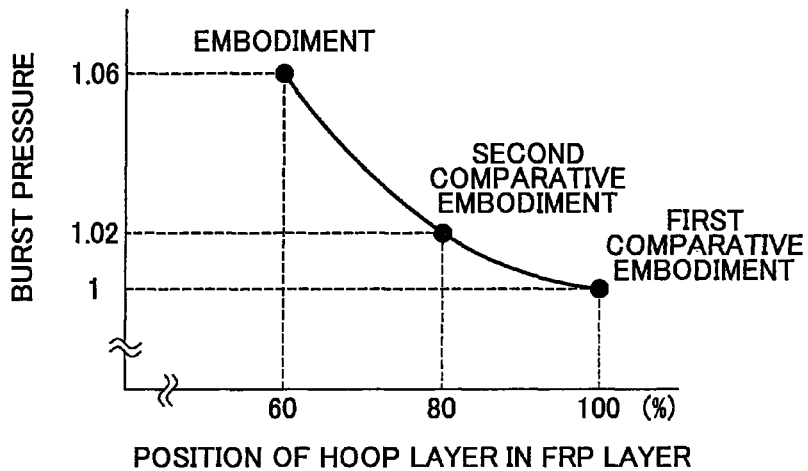
FIG. 4 is a graph that shows the correlation between the position of a hoop layer in a fiber reinforced plastics layer (FRP layer) and the burst pressure of a high-pressure tank for the high-pressure tank according to the embodiment and high-pressure tanks according to first and second comparative embodiments.

FIG. 4 is a graph that shows the correlation between the position of the hoop layer in the fiber reinforced plastics layer (FRP layer) and the burst pressure of a high-pressure tank for the high-pressure tank 10 according to the embodiment and high-pressure tanks according to first and second comparative embodiments. Although not shown in the drawing, between the high-pressure tank 10 according to the embodiment and the high-pressure tanks according to the first and second comparative embodiments, the shape of the liner 40, the total number of the hoop layers and low-angle helical layers, and the like, are the same, but the position of the hoop layer in the fiber reinforced plastics layer is different. In FIG. 4, the position of the hoop layer in the fiber reinforced plastics layer means the range in which 90% or more of the sum of the thickness of the inner hoop layer 54 and the thickness of the outer hoop layer in the mixed layer 56 occupies a portion of the fiber reinforced plastics layer adjacent to the liner 40 in the thickness direction on the liner cylindrical portion 42.

As shown in FIG. 4, in the high-pressure tank 10 according to the embodiment, 90% or more of the sum of the thickness of the inner hoop layer 54 and the thickness of the outer hoop layer in the mixed layer 56 is arranged within the range of 60% of the fiber reinforced plastics layer 50 adjacent to the liner 40 in the thickness direction on the liner cylindrical portion 42. In contrast to this, in the high-pressure tank according to the first comparative embodiment, on the liner cylindrical portion 42, 90% or more of the sum of the thickness of the inner hoop layer 54 and the thickness of the outer hoop layer in the mixed layer 56 is arranged within the range of 100% of the fiber reinforced plastics layer adjacent to the liner 40 in the thickness direction. In addition, in the high-pressure tank according to the second comparative embodiment, on the liner cylindrical portion 42, 90% or more of the sum of the thickness of the inner hoop layer 54 and the thickness of the outer hoop layer in the mixed layer 56 is arranged within the range of 80% of the fiber reinforced plastics layer adjacent to the liner 40 in the thickness direction. That is, in the high-pressure tank 10 according to the embodiment, in the fiber reinforced plastics layer, the hoop layer is concentratively laminated adjacent to the liner 40 as compared with the high-pressure tanks according to the first and second comparative embodiments.

Then, as shown in FIG. 4, where the burst pressure of the high-pressure tank according to the first comparative embodiment is 1, the burst pressure of the high-pressure tank according to the second comparative embodiment was 1.02, and the burst pressure of the high-pressure tank 10 according to the embodiment was 1.06. That is, in the high-pressure tank 10 according to the embodiment, the burst pressure was improved by 6% as compared with the high-pressure tank according to the first comparative embodiment.

C2. Accelerated Cycle Test

Figure 5:
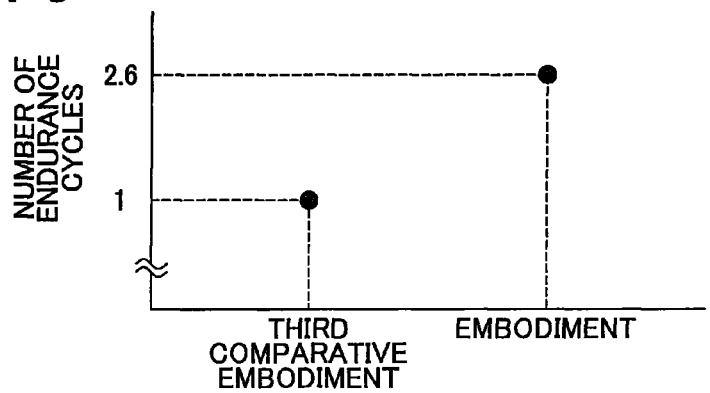
FIG. 5 is a graph that shows the number of endurance cycles in the accelerated cycle test for the high-pressure tank according to the embodiment and a high-pressure tank according to a third comparative embodiment.

FIG. 5 is a graph that shows the number of endurance cycles in the accelerated cycle test for the high-pressure tank 10 according to the embodiment and a high-pressure tank according to a third comparative embodiment. Although not shown in the drawing, between the high-pressure tank 10 according to the embodiment and the high-pressure tank according to the third comparative embodiment, the shape of the liner 40 and the layer configuration of the inner hoop layer 54 and mixed layer 56 are the same. Then, the high-pressure tank 10 according to the embodiment includes the low-angle helical layer 52, whereas the high-pressure tank according to the third comparative embodiment does not include the low-angle helical layer 52.

As shown in FIG. 5, where the number of endurance cycles in the accelerated cycle test for the high-pressure tank according to the third comparative embodiment is 1, the number of endurance cycles in the accelerated cycle test for the high-pressure tank 10 according to the embodiment was 2.6. That is, in the high-pressure tank 10 according to the embodiment, the number of endurance cycles in the accelerated cycle test was improved by 160% as compared with the high-pressure tank according to the third comparative embodiment.

C3. Thickness of Fiber Reinforced Plastics Layer

Figure 6:
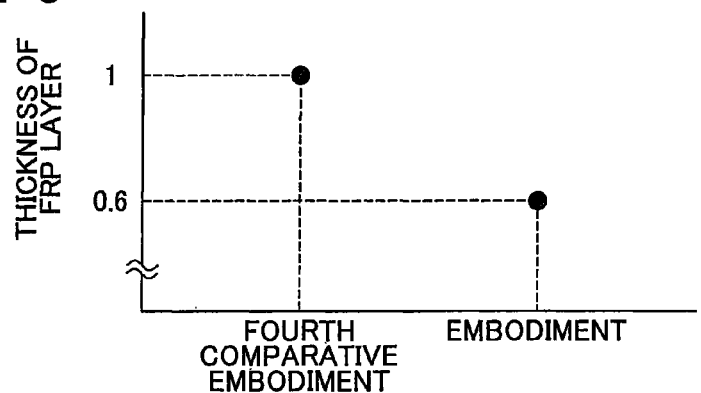
FIG. 6 is a graph that shows the thickness of a fiber reinforced plastics layer, required to pass a predetermined accelerated cycle test, for the high-pressure tank according to the embodiment and a high-pressure tank according to a fourth comparative embodiment.

FIG. 6 is a graph that shows the thickness of the fiber reinforced plastics layer, required to pass a predetermined accelerated cycle test, for the high-pressure tank 10 according to the embodiment and a high-pressure tank according to a fourth comparative embodiment. Although not shown in the drawing, between the high-pressure tank 10 according to the embodiment and the high-pressure tank according to the fourth comparative embodiment, the shape of the liner 40 and the layer configuration of the inner hoop layer 54 are the same. Then, the high-pressure tank 10 according to the embodiment includes the low-angle helical layer 52, whereas the high-pressure tank according to the fourth comparative embodiment does not include the low-angle helical layer 52. In addition, between the high-pressure tank 10 according to the embodiment and the high-pressure tank according to the fourth comparative embodiment, the thickness of the mixed layer 56 is changed to change the thickness of the fiber reinforced plastics layer.

As shown in FIG. 6, where the thickness of the fiber reinforced plastics layer in the high-pressure tank according to the fourth comparative embodiment is 1, the thickness of the fiber reinforced plastics layer 50 in the high-pressure tank 10 according to the embodiment was 0.6. That is, in the high-pressure tank 10 according to the embodiment, in order to pass the predetermined accelerated cycle test, the thickness of the fiber reinforced plastics layer was able to be reduced by 40% as compared with the high-pressure tank according to the fourth comparative embodiment.

As described above, in the manufacturing method for the high-pressure tank 10 according to the present embodiment, the strength of the liner 40 (particularly, the liner dome portions 44) is enhanced through the inner helical layer forming step, and then the inner hoop layer forming step is carried out, so, even when the inner hoop layer forming step is carried out while applying a relatively high tension to the fiber 51 in a state where internal pressure is applied to the liner 40, it is possible to suppress deformation of the liner 40 at the time when the inner hoop layer forming step is carried out. Furthermore, in the manufacturing method for the high-pressure tank 10 according to the present embodiment, hoop winding (hoop layer) that significantly exhibits the effect of improving the circumferential strength of the liner 40 is concentratively laminated at the inner layer side at which stress applied in the circumferential direction of the liner 40 is relatively large according to the thick cylinder theory, so it is possible to effectively improve the circumferential strength of the liner 40. Then, as shown in FIG. 4 and FIG. 5, it was empirically confirmed that the reliability of the high-pressure tank 10 may be improved by the manufacturing method for the high-pressure tank 10 according to the present embodiment.

In addition, in the manufacturing method for the high-pressure tank 10 according to the present embodiment, the effect of improving the strength of the high-pressure tank 10, exhibited by each layer in the fiber reinforced plastics layer 50, may be effectively utilized as compared with the existing art, so, in order to obtain the performance (the pressure resistance and durability) of the high-pressure tank equivalent to the existing art, the total number of layers that constitute the fiber reinforced plastics layer 50 may be reduced as shown in FIG. 6. Thus, it is possible to reduce the size, weight and cost of the high-pressure tank. In addition, in order to obtain the performance of the high-pressure tank equivalent to the existing art, when a fiber with a lower grade in terms of strength or stiffness is used, it is possible to reduce the cost of the high-pressure tank. In addition, when the number of the layers that constitute the fiber reinforced plastics layer 50 is equal to that of the existing art, it is possible to improve the strength of the high-pressure tank. In addition, when the outer shape of the high-pressure tank is the same as that of the existing art, it is possible to increase the capacity of the liner. Thus, when the high-pressure tank is filled with fuel gas and is then mounted on, for example, a vehicle, it is possible to extend the cruising range of the vehicle.

In addition, in the manufacturing method for the high-pressure tank 10 according to the present embodiment, the low-angle helical winding is used in the inner helical layer forming step and the mixed layer forming step, so it is possible to effectively improve the strength in the direction along the central axis AX of the liner 40. In addition, the low-angle helical winding is able to reduce the number of windings, that is, the usage of the fiber 51, as compared with the high-angle helical winding in order to obtain the same strength in terms of the strength in the direction along the central axis AX of the liner 40, so it is possible to reduce the size, weight and cost of the high-pressure tank.

In addition, with the manufacturing method for the high-pressure tank 10 according to the present embodiment, as shown in FIG. 3B, each edge of the inner hoop layer 54 is formed in a slant shape in the inner hoop layer forming step to thereby make it possible to suppress a loss of winding shape of the fiber 51 at each edge of the inner hoop layer 54. In addition, each edge of the inner hoop layer 54 is formed in a slant shape to suppress meandering of the fiber 51, that is, deviation of the winding position of the fiber 51, at the time of forming the low-angle helical layer in the mixed layer 56 to thereby make it possible to effectively utilize the effect of improving the strength in the direction along the central axis AX of the liner 40, exhibited by the low-angle helical layer.

In addition, in the manufacturing method for the high-pressure tank 10 according to the present embodiment, the outer surface of the inner hoop layer 54 and low-angle helical layer 52 on each liner dome portion 44 forms a uniform stress surface, so the low-angle helical layer in the mixed layer 56 formed on the outer surface of these layers is formed at uniform stress and may be effectively utilized to improve the strength of the high-pressure tank 10.

D. Alternative Embodiments

The embodiment of the invention is described above; however, the aspect of the invention is not limited to the above embodiment. The aspect of the invention may be implemented in various forms without departing from the scope of the invention. For example, the following alternative embodiments are possible.

D1. First Alternative Embodiment

In the above embodiment, the low-angle helical layer 52 is used in the fiber reinforced plastics layer 50; however, the aspect of the invention is not limited to this configuration. Instead of the low-angle helical layer 52, a high-angle helical layer may be used. This also applies to the low-angle helical layer in the mixed layer 56.

D2. Second Alternative Embodiment

In the above embodiment, on the liner cylindrical portion 42, 90% or more of the sum of the thickness of the inner hoop layer 54 and the thickness of the outer hoop layer in the mixed layer 56 is arranged within the range of 60% of the fiber reinforced plastics layer adjacent to the liner 40 in the thickness direction; however, the aspect of the invention is not limited to this configuration. It is also applicable that, on the liner cylindrical portion 42, 90% or more of the sum of the thickness of the inner hoop layer 54 and the thickness of the outer hoop layer in the mixed layer 56 is arranged within the range of 75% of the fiber reinforced plastics layer adjacent to the liner 40 in the thickness direction.

D3. Third Alternative Embodiment

In the above embodiment, the fiber reinforced plastics layer 50 is formed of the single low-angle helical layer 52; however, the number of low-angle helical layers 52 may be selectively set on the basis of the strength required of the high-pressure tank 10 and the strength required to manufacture the high-pressure tank 10. This also applies to the layer configuration of each of the other layers in the fiber reinforced plastics layer 50.

D4. Fourth Alternative Embodiment

In the above embodiment, the mixed layer 56 is formed by alternately laminating the low-angle helical layer (outer helical layer) and the hoop layer (outer hoop layer); however, the aspect of the invention is not limited to this configuration. The mixed layer 56 just needs to be formed of the outer helical layer and the outer hoop layer.

D5. Fifth Alternative Embodiment

In the above embodiment, the thermosetting resin and the fiber that constitute the fiber reinforced plastics layer 50 each are formed of the same type; however, at least part of the thermosetting resin and the fiber may be formed of a different type.

The invention claimed is:
1. A high-pressure tank that is used to store fluid, comprising:
a liner that has a cylindrical portion having a cylindrical shape and dome portions having a domical shape and provided on both ends of the cylindrical portion; and
a fiber reinforced plastics layer that is formed on an outer surface of the liner by filament winding, the fiber reinforced plastics layer including:
an inner helical layer formed of a fiber impregnated with thermosetting resin, the fiber of the inner helical layer being wound on an outer surface of at least part of each dome portion and an outer surface of the cylindrical portion;
an inner hoop layer formed of a fiber impregnated with thermosetting resin, the fiber of the inner hoop layer being wound, by hoop winding in multiple layers, on an outer surface of the inner helical layer over the cylindrical portion in a thickness direction of the fiber reinforced plastics layer; and
a mixed layer formed of an outer helical layer and an outer hoop layer, the mixed layer being formed on an outer surface of the inner hoop layer and over the outer surface of the inner helical layer on each dome portion, wherein:
the outer helical layer is formed of a fiber impregnated with thermosetting resin, the fiber of the outer helical layer being helically wound on an outer surface of the inner hoop layer and over the outer surface of the inner helical layer on the each dome portion;

the outer hoop layer is formed of a fiber impregnated with thermosetting resin, the fiber of the outer hoop layer being wound, by hoop winding, on an outer surface of the outer helical layer;

the inner hoop layer, and the outer hoop layer in the mixed layer, constitute a combined hoop layer; and over the cylindrical portion in the thickness direction of the fiber reinforced plastics layer, 90% or more of a thickness of the combined hoop layer is disposed within a range in which 75% of a thickness of the fiber reinforced plastics layer is disposed, the range being adjacent to the liner.

2. The high-pressure tank according to claim 1, wherein the thermosetting resin included in the inner helical layer, the thermosetting resin included in the inner hoop layer, and the thermosetting resin included in the mixed layer are of the same type.

3. The high-pressure tank according to claim 1, wherein at least one of the thermosetting resin included in the inner helical layer, the thermosetting resin included in the inner hoop layer, and the thermosetting resin included in the mixed layer is of a different type from the other thermosetting resins.

4. The high-pressure tank according to claim 1, wherein the fiber included in the inner helical layer, the fiber included in the inner hoop layer and the fiber included in the mixed layer are of the same type.

5. The high-pressure tank according to claim 1, wherein at least one of the fiber included in the inner helical layer, the fiber included in the inner hoop layer and the fiber included in the mixed layer is of a different type from the other fibers.

6. The high-pressure tank according to claim 1, wherein over the cylindrical portion in the thickness direction, 90% or more of the combined hoop layer is arranged within a range in which 60% of the fiber reinforced plastics layer is arranged, the 60% of the fiber reinforced plastics layer being adjacent to the liner.

7. The high-pressure tank according to claim 1, wherein a thickness of the inner hoop layer is reduced over the cylindrical portion as a portion of the inner hoop layer approaches a boundary portion between the cylindrical portion and the each dome portion.

8. The high-pressure tank according to claim 7, wherein the liner has a discontinuous shape at the boundary portion between the cylindrical portion and the each dome portion, the outer surface of the inner helical layer on the each dome portion forms a uniform stress surface, and the outer surface of the inner hoop layer on the each dome portion forms a uniform stress surface.

9. The high-pressure tank according to claim 1, wherein the outer helical layer and the outer hoop layer are alternately laminated.

* * * * *